United States Patent Office 3,428,570
Patented Feb. 18, 1969

3,428,570
TIRE INFLATOR GAS
Albert E. Daniels, Williamsville, N.Y., assignor to Impact Container Corporation, Alden, N.Y., a corporation of New York
No Drawing. Filed Dec. 9, 1966, Ser. No. 600,382
U.S. Cl. 252—372        2 Claims
Int. Cl. C09k 3/30, 3/00

ABSTRACT OF THE DISCLOSURE

Gas composition which is a mixture of bromo trifluoro methane and 20 to 26% ethane; there may be additionally contained up to about 5% impurities in this mixture.

---

This invention relates to the inflation of tires. It more particularly refers to a particular pneumatic fluid useful in the inflation of automobile tires.

This specification describes a desirable pneumatic fluid, bromo trifluoro methane admixed with up to about 26 weight percent of ethane, which is particularly suited to use in the inflation of deflated spare automobile tires.

Quite recently there has been developed the concept of providing spare tires for automobiles in a substantially fully deflated condition for storage in the trunk of an automobile. It is proposed to provide a source of a pneumatic fluid as the inflating means in operative detachable association with the deflated spare tire. Thus when the need arises for the spare tire to be put in service, it is practical to inflate such from a self-contained portable source of pneumatic fluid. The portable pneumatic fluid source is then detached, the tire mounted and the vehicle can then proceed in the same manner as with prior spare tires which have been carried in an inflated condition.

It will be appreciated that an entirely new tire has had to be designed for this use as a deflated spare since the purpose of such use is to provide a spare tire which takes up significantly less space in the trunk than the conventional inflated spare tire. One of the particular problems which has been encountered in this art has to do with the fact that the deflated spare tire must be capable of inflation at relatively low temperatures at internal pressures sufficient to carry the load of the automobile. Further, it is necessary that this same low temperature inflated tire must be capable of withstanding relatively high temperature road operationg conditions without building up excess pressure. This is particularly critical since the tire construction is such that large pressures cannot be withheld.

In particular, the inflating pneumatic fluid must be capable of providing at least 15 pounds per square inch of pressure in such deflated spare tire at about −20° F. yet must not build an internal tire pressure of greater than about 34 pounds per square inch when such tire is operated at road conditions of about 80 to 90° F. or even 130° F.

It has been discovered according to this invention that one particular class of pneumatic fluids possesses all of the properties necessary to conform to these requirements. Thus it has been found that a mixture of ethane and bromo, trifluoro methane in non-flammable proportions are eminently suited to use in this tire inflating application. It is particularly preferred to utilize such mixtures comprising up to about 26 weight percent ethane. The optimum mixture has been found to be about 20 to 26 weight percent ethane and about 74 to 80 weight percent bromo trifluoro methane. It is of course within the spirit and scope of this invention to provide such mixtures with minor amounts, for example up to about 5 weight percent, of impurities therein. Such impurities may for example be methane, ethylene, mixed halogenated methanes other than the desired bromo, trifluoro substituted material set forth above, etc.

It is desirable that the pneumatic fluid composition of this invention be compressible at about 500 to 1200 p.s.i.g. to a physical state which is substantially wholly liquid or at least liquid with only so much gas thereover as will maintain the desired pressure. Further, this pneumatic fluid should be substantially all gas at pressures less than about 50 p.s.i.g. at temperatures of about −20° F. to about 100° F.

The composition of the pneumatic fluid of this invention has been found to possess all of the attributes required as set forth above for use as an inflation medium for deflated spare tires.

What is claimed is:
1. A mixture consisting essentially of about 20 to 26 weight percent ethane and about 74 to 80 weight percent bromo trifluoro methane.
2. A mixture as claimed in claim 1, additionally containing up to about 5 weight percent impurities.

References Cited

UNITED STATES PATENTS 2,653,130   9/1953   Eiseman _____ 252—8
2,991,629   7/1961   Rose _____ 222—394 XR LEON ZITVER, Primary Examiner.

H. MARS, Assistant Examiner.

U.S. Cl. X.R.

222—394